United States Patent [19]

Liva

[11] Patent Number: 4,587,042

[45] Date of Patent: May 6, 1986

[54] IMMERSION OIL SYSTEM

[76] Inventor: Michael Liva, 16 High St., Wayne, N.J. 07470

[21] Appl. No.: 583,676

[22] Filed: Feb. 27, 1984

[51] Int. Cl.⁴ .................. G02B 5/20; G01N 21/15
[52] U.S. Cl. .................................. 252/582; 252/1; 252/408.1
[58] Field of Search .............. 252/582, 1, 9, 408.1; 350/418; 73/36

[56] References Cited

U.S. PATENT DOCUMENTS

| | | | |
|---|---|---|---|
| 3,497,562 | 2/1970 | Levins et al. | 260/609 |
| 3,929,667 | 12/1975 | Bautis | 252/408.1 X |
| 3,979,301 | 9/1976 | Ushioda | 252/1 |
| 4,108,794 | 8/1978 | Yonekubo | 252/408.1 X |
| 4,189,866 | 2/1980 | Treadaway | 252/301.32 X |
| 4,402,887 | 9/1983 | Kuriyama et al. | 264/22 |
| 4,465,621 | 8/1984 | Sacher | 252/408.1 X |
| 4,491,533 | 1/1985 | Sacher et al. | 252/408.1 X |
| 4,493,533 | 1/1985 | Petrzilka et al. | 252/408.1 X |

FOREIGN PATENT DOCUMENTS

| | | | |
|---|---|---|---|
| 55-92799 | 7/1980 | Japan . | |
| 920 | of 1866 | United Kingdom | 350/418 |
| 101260 | 8/1916 | United Kingdom | 350/418 |
| 2097395 | 11/1982 | United Kingdom | 252/408.1 |

Primary Examiner—John F. Terapane
Assistant Examiner—Catherine S. Kilby
Attorney, Agent, or Firm—Kenyon & Kenyon

[57] ABSTRACT

An immersion oil for use in microscopy having a high refractive index and a high principal dispersion factor without the inclusion of polychlorinated biphenyls (PCB's) and terpenyls. The immersion oil being a mixture of a low molecular weight hydrocarbon resin diphenyl isodecyl phosphite, and one or more of polybutylene, mineral oil, and trilauryl trithio phosphite.

17 Claims, No Drawings

IMMERSION OIL SYSTEM

BACKGROUND OF THE INVENTION

1. Field of the Invention

The present invention relates to immersion oils for use in microscopy and specifically relates to an immersion oil system in which the amount of a limited number of basic components may be varied in proportion to each other to create a wide variety of specific oils possessing one or more predetermined physical properties which may be required in a given microscopal application.

The image viewed in a microscope results from light rays, either reflected from or transmitted through the object or specimen to be viewed and then through the optical system of the microscope to the eye or other image sensing or recording devices. The optical system typically comprises the medium in which the object to be viewed is placed, a coverglass, the ambient atmosphere and the glass, plastic or other material which comprises the lens system of the microscope.

It is preferred to eliminate air gaps along a microscopal path of light for several reasons. Relative to glass, plastic, and immersion fluids typically used in the optical systems of microscopes, air or some other low refractive index material limits the angle of light that can enter the objective lens of the microscope, and hence limits the effective aperture and resolving power of the microscope. Replacement of such air gaps with a relatively high refractive index immersion oil thereby effectively increases the effective aperture and resolving power of the system.

Furthermore when light rays pass through one medium to another a certain amount of light is lost due to reflection which occurs at the interface of two different media. The degree of reflection varies with the degree of difference between the indices of refraction of the media through which the light rays pass. Inasmuch as the greatest differences in indices of refraction will typically occur between air (refractive index 1.00) and other light transmissive media (refractive indices typically ranging from about 1.48 to 1.60), it is ideally preferred to compensate for any air gaps which occur between the viewed object and the image sensing or recording device with a medium which is capable of maintaining a substantially uniform index of refraction with all of the other media through which the light will pass.

2. Description of the Prior Art

Immersion oils having predetermined indices of refraction are typically used to fill such air gaps. In addition to having an appropriate index of refraction, an immersion oil may also be required to have specific light absorption, fluoresence, and viscosity properties, depending upon the specific application to which the oil is to be put.

An immersion oil for use in general microscopy as specified by the standards of DIN §5884 should have a principal index of refraction ($n_e$) of 1.518±0.0004 and a principal dispersion factor ($V_e$) of 44±5. The standards of DIN §5884 further require that an immersion oil should not selectively absorb light having a wavelength in the range extending between about 380 and about 780 nanometers (nm). The standards also require that in normal illumination, an immersion oil should not visibly fluoresce. With respect to viscosity, an immersion oil complying with the standards must also be capable of maintaining the interface between the cover glass and the microscope objective, as well as between the condenser and the microscope slides. In addition the immersion oil must be physically and chemically stable.

Conventional immersion oils typically contain polychlorinated biphenyls (PCBs) which when blended with mineral oil and viscosity adjusting compounds provide a generally useful immersion oil having many of the ideal characteristics described hereinabove. In recent years, however, PCB's have been discovered to be carcinogenic, a hazard to the human environment, and are generally regarded as toxic. Furthermore PCB's are difficult to dispose of after use since they are extremely stable and nonbiodegradable.

SUMMARY OF THE INVENTION

The immersion oil for use in microscopy according to the instant invention eliminates the use of PCB's or terphenyls. Thus, the immersion oil of the invention comprises a mixture of a low molecular weight hydrocarbon resin comprising alpha-methyl styrene, diphenyl isodecyl phosphite, and at least one of a mineral oil, a polybutylene, or trilaurlyl trithio phosphite.

Unlike immersion oil mixtures containing PCB's or terphenyls, mixtures of these limited number of components in amounts according to the instant invention do not visibly fluoresce in normal illumination and show no more than weak fluoresence in a darkened room under strong UV irradiation in accordance with the standards of DIN §5884.

Such mixtures according to the invention further comply with conventional immersion oil standards in that they possess desired principal refractive indices, principal dispersion factors, and viscosities.

It is an object of the invention to provide an immersion oil possessing all of the optical properties required for use in general microscopy without the use of PCB's or terphenyls.

It is a further object of the invention to provide an immersion oil having a low autofluorescence in the presence of ultraviolet light.

It is also an object of the invention to provide an immersion oil which can be varied to provide a number of different characteristics and properties.

DETAILED DESCRIPTION OF THE PREFERRED EMBODIMENTS

The immersion oil of the present invention comprises a predetermined mixture of (a) a minor fraction by volume of a low molecular weight hydrocarbon resin (b) diphenyl isodecyl phosphite in the range of about one-third to two-fifths by volume, and (c) at least one of mineral oil, polybutylene, or trilaurlyl trithio phosphite.

The low molecular weight hydrocarbon resin used in the immersion oil preferably comprises a derivative of alpha-methyl styrene having a softening point in the range extending between about 67 and about 88 degrees Centigrade. Low molecular weight hydrocarbon resins most preferred for use in the present invention are those sold under the trademark KRISTALEX 3070 and 3085 by Hercules, Inc., 910 Market Street, Wilmington, Del. These resins are largely comprised of alpha-methyl styrene or derivatives thereof, are water-white, highly color stable, nonpolar, soluble in aliphatic, aromatic, and chlorinated hydrocarbons, and insoluble in alcohols and glycols with limited solubility in nitroparaffins. The KRISTALEX resins have a specific gravity of about 1.06, an acid number less than 1, a Gardner color index less than 1, and a principal dispersion factor in the range extending from about 30 to about 38. The KRISTALEX 3070 and 3085 resins differ in that they have a softening point in the range of about 67°–73° C. and 82°–88° C., a bromine nunber of about 7.8 and 3.0, and a flash point of about 445° C. and 450° C., respectively.

The polybutylenes preferred for use in the invention have an average molecular weight in the range extending from about 570 to about 3,000 grams per mole. Suitable polybutylenes are available from S&S Chemical Company, Chevron, B.P. Chemicals, Cosden Oil & Chemical Co., and Amoco. Preferably, such polybutylenes are selected to have a viscosity (at 100° Fahrenheit) in the range extending from about 3440 to about 900,000 centistokes (cSt).

Typical examples of commercially available polybutylenes suitable for use in the present invention are those sold by Amoco under the designation H-35, H-300E, and H-1900 having the properties listed in Table I.

TABLE I

| PROPERTY | Amoco Polybutylene Grade | | |
|---|---|---|---|
|  | H-35 | H-300E | H-1900 |
| Viscosity in Centistokes at 98.9° C. | 74–79 | 627–675 | 4069–4382 |
| Flash Point, °C. Cleveland Open Cup | 166 | 227 | 243 |
| Average Molecular Weight (Grams/Mole) | 660 | 1290 | 2300 |
| Principal Refractive Index | 1.4872 | 1.4970 | 1.5042 |

The mineral oil preferred for use in the invention is colorless, transparent, insoluble in water or alcohol, free or nearly free from fluorescence in normal illumination and when exposed to ultraviolet light in a darkened room. Such preferred mineral oils have a specific gravity in the range extending from about 0.85 to about 0.91 grams/ml and have a kinematic viscosity of not less than about 38 Centistokes at 100° F.

With respect to the optical properties of the immersion oil of the invention, the index of refraction ($n_e$) and the principal dispersion factor ($V_e$) of each of the components of the mixture are listed in Table II.

TABLE II

| COMPONENT | Ne(±.04) | Ve(±7) |
|---|---|---|
| Low Molecular Weight Hydrocarbon Resin | 1.60 | 34 |
| Mineral Oil | 1.48 | 55 |
| Polybutylene | 1.50 | 54 |
| Diphenyl Isodecyl Phosphite | 1.52 | 35 |
| Trilauryl Trithio Phosphite | 1.50 | 44 |

Each of the preferred embodiments of the immersion oil of the invention complies with the standards of DIN §5884 by having a refractive index in the range extending from about 1.5176 to about 1.5184, a principal dispersion factor in the range extending from about 41 to about 49, and being non-absorptive of 380–780 nm light, non-fluoresent, physically and chemically stable, and capable of maintaining the interface between the cover glass and microscope objective and between the condenser and the microscope slide. These preferred embodiments comprise the components listed in TABLE II in the appropriate amounts listed in TABLE III.

TABLE III

| COMPONENT | APPROXIMATE RANGE IN PERCENT BY VOLUME |
|---|---|
| Low Molecular Weight Hydrocarbon Resin | 9–20% |
| Mineral Oil | 0–50% |
| Polybutylene | 0–60% |
| Diphenyl Isodecyl Phosphite | 30–45% |
| Trilauryl Trithio Phosphite | 0–15% |

Table IV lists four mixtures comprising the preferred embodiments of the immersion oil of the invention in volume percent of each component, each mixture having an index of refraction of about 1.518 and a principal disperson factor of about 44. As shown by Table IV, mixtures of components constituting widely different proportions of the immersion oil mixture may be used for specific applications requiring a predetermined property such as ultraviolet light transmissibility, high or low viscosity, or low cost.

TABLE IV

| | Percent by Volume | | | | |
|---|---|---|---|---|---|
| Property | Hydro-Carbon Resin | Mineral Oil | Polybutylene | Diphenyl Isodecyl Phosphite | Trilauryl Trithio Phosphite |
| General Useage | 11.8 | 15.8 | 29.0 | 37.3 | 6.1 |
| High UV Transmissibility | 14.0 | 31.6 | 00.0 | 42.1 | 12.3 |
| High Viscosity | 9.6 | 00.0 | 58.0 | 32.4 | 00.0 |
| Low Cost | 18.5 | 43.5 | 00.0 | 36.2 | 00.0 |

The specific mixtures listed in Table III are intended to be simply exemplary since many other mixtures can be devised having the most preferred optical characteristics of an index of refraction of about 1.518 and a principal dispersion number of about 44.

In preparing an immersion oil mixture of the invention, the low molecular weight hydrocarbon resin is heated to about 75° Centigrade and then mixed. The heated hydrocarbon resin is then mixed by constant stirring into a proportionate amount of diphenyl isodecyl phosphite, and a proportionate amount of one or more of mineral oil, polybutene, or trilauryl trithio phosphite, as specified above.

What is claimed is:

1. An immersion oil for use in microscopy consisting essentially of a mixture of a minor fraction by volume of a low molecular weight hydrocarbon resin made from alpha methyl styrene or derivatives thereof, diphenyl isodecyl phosphite in the range of about 30% to about 45% by volume of the immersion oil, and the remainder of said immersion oil being; at least one of mineral oil, polybutylene fluid or trilauryl trithio phosphite.

2. The immersion oil of claim 1 wherein said low molecular weight hydrocarbon resin comprises alpha-methyl styrene.

3. The immersion oil of claim 1 in which said low molecular weight hydrocarbon resin has a softening point in the range extending from about 67 to about 88 degrees Centigrade.

4. The immersion oil of claim 1 in which the low molecular weight hydrocarbon resin comprises from about 9 to about 20% by volume of the immersion oil.

5. The immersion oil of claim 1 in which the diphenyl isodecyl phosphite comprises from about one-third to about two-fifths by volume of the immersion oil.

6. The immersion oil of claim 1 in which the mineral oil comprises from about 15 to about 45% by volume of the immersion oil.

7. The immersion oil according to claim 1 wherein the remainder is polybutylene fluid in an amount of about 20 to about 60% by volume of the immersion oil.

8. The immersion oil according to claim 1 wherein the remainder is trilauryl trithio phosphite in an amount of about 6 to about 12% by volume of the immersion oil.

9. An immersion oil for use in microscopy consisting essentially of a mixture of a minor fraction by volume of a low molecular weight hydrocarbon resin made from alpha-methyl styrene or derivatives thereof, mineral oil in the range of about 15 to about 45% by volume, diphenyl isodecylphosphite in the range of about 32 to about 42% by volume of the immersion oil, and the remainder of said immersion oil being at least one of polybutylene fluid and trilauryl trithio phosphite.

10. The immersion oil according to claim 9 wherein the remainder is polybutylene fluid in an amount of about 29 to about 58% by volume of the immersion oil.

11. The immersion oil according to claim 9 wherein the remainder is trilauryl trithio phosphite in an amount of about 6 to about 12% by volume of the immersion oil.

12. An immersion oil for use in microscopy consisting essentially of a mixture of a minor fraction by volume of a low molecular weight hydrocarbon resin made from alpha methyl styrene or derivatives thereof, mineral oil in the range of about 15 to about 45% by volume, and the remainder of said immersion oil being at least one of polybutylene fluid, diphenyl isodecyl phosphite, and trilauryl trithio phosphite.

13. The immersion oil according to claim 12 wherein the remainder is polybutylene fluid in an amount of about 29% to about 58% by volume of the immersion oil.

14. The immersion oil according to claim 12 wherein the remainder is diphenyl isodecyl phosphite in an amount of about 32 to about 42% by volume of the immersion oil.

15. The immersion oil according to claim 12 wherein the remainder is trilauryl trithio phosphite in an amount of about 6 to about 12% by volume of the immersion oil.

16. The immersion oil according to claim 4 consisting essentially of:

from about 9 to about 20% by volume of said low molecular weight hydrocarbon resin made from alpha-methyl styrene or derivatives thereof;

from about 30 to about 45% by volume of said diphenyl isodecyl phosphite;

from about 0 to about 50% by volume of said mineral oil;

from about 0 to about 59% by volume of said polybutylene; and, from about 0 to about 15% by volume of said trilauryl trithio phosphite;

wherein one or more of said mineral oil, polybutylene fluid and trilauryl trithio phosphite is present as the remainder of said immersion oil.

17. The immersion oil of claim 1 wherein the remainder is polybutylene having an average molecular weight in the range extending from about 570 to about 3000 grams per mole.

* * * * *

UNITED STATES PATENT AND TRADEMARK OFFICE
CERTIFICATE OF CORRECTION

PATENT NO. : 4,587,042
DATED : May 6, 1986
INVENTOR(S) : Michael Liva

It is certified that error appears in the above-identified patent and that said Letters Patent is hereby corrected as shown below:

Column 1, line 35, delete "another" and insert

--another,--;

Column 1, line 55, delete "fluoresence" and insert

--fluorescence--;

Column 2, line 23, delete "trilaurlyl" and insert

--trilauryl--;

Column 2, line 28, delete "fluoresence" and insert

--fluorescence--;

Column 2, line 54, delete "trilaurlyl" and insert

--trilauryl--;

Column 3, line 63, delete "non-fluoresent" and insert

--non-fluorescent--;

UNITED STATES PATENT AND TRADEMARK OFFICE
CERTIFICATE OF CORRECTION

PATENT NO. : 4,587,042

DATED : May 6, 1986

INVENTOR(S) : Michael Liva

It is certified that error appears in the above-identified patent and that said Letters Patent is hereby corrected as shown below:

Column 4, line 44, delete "polybutene" and insert --polybutylene--;

Column 5, line 15, delete "isodecylphosphite" and insert --isodecyl phosphite--;

Column 6, line 22, delete "tylene;" and insert --tylene fluid;--; and

Column 6, line 29, after "polybutylene" insert --fluid--.

Signed and Sealed this

Twenty-first Day of October, 1986

[SEAL]

*Attest:*

DONALD J. QUIGG

*Attesting Officer*     *Commissioner of Patents and Trademarks*